US012462522B2

(12) United States Patent
Chiu (10) Patent No.: US 12,462,522 B2
(45) Date of Patent: Nov. 4, 2025

(54) IMAGE ANALYSIS MODEL ADJUSTMENT METHOD AND IMAGE ANALYSIS APPARATUS

(71) Applicant: VIVOTEK INC., New Taipei (TW)

(72) Inventor: Shu-Shu Chiu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 282 days.

(21) Appl. No.: 18/383,038

(22) Filed: Oct. 23, 2023

(65) Prior Publication Data

US 2024/0144636 A1 May 2, 2024

(30) Foreign Application Priority Data

Oct. 31, 2022 (TW) .................................. 111141300

(51) Int. Cl.
*G06V 10/42* (2022.01)
*G06T 7/11* (2017.01)

(52) U.S. Cl.
CPC .............. *G06V 10/431* (2022.01); *G06T 7/11* (2017.01); *G06T 2207/20132* (2013.01)

(58) Field of Classification Search
CPC .................... G06V 10/431; G06T 7/11; G06T 2207/20132
USPC ........................................................ 382/190
See application file for complete search history.

(56) References Cited

U.S. PATENT DOCUMENTS

2017/0150148 A1* 5/2017 Zhang .................... H04N 19/18
2020/0105004 A1 4/2020 Haim
2023/0367854 A1* 11/2023 Mukherjee ............... G06N 3/08

FOREIGN PATENT DOCUMENTS

CN 113362238 A 9/2021
TW 202022802 A 6/2020
TW I779957 B 10/2022

* cited by examiner

*Primary Examiner* — Amandeep Saini
(74) *Attorney, Agent, or Firm* — Winston Hsu (57) ABSTRACT

An image analysis model adjustment method is applied to an image analysis apparatus. The image analysis model adjustment method includes dividing a detection image acquired by the imager analysis apparatus into a plurality of first sub-images via a valid size, transforming the plurality of first sub-images from a spatial domain to a frequency domain to generate a plurality of first frequency domain images, distributing the plurality of first frequency domain images into several crop groups via a predefined set value, analyzing frequency responses at the same frequency in each crop group to provide a specific frequency response, collecting specific frequency responses of the crop groups to generate frequency domain group data, and analyzing the frequency domain group data to acquire a prediction result of the detection image so as to decide whether to adjust the valid size in accordance with the predicted result.

18 Claims, 10 Drawing Sheets

IMAGE ANALYSIS MODEL ADJUSTMENT METHOD AND IMAGE ANALYSIS APPARATUS

BACKGROUND OF THE INVENTION

1. Field of the Invention

The present invention relates to an image analysis model adjustment method and an image analysis apparatus, and more particularly, to an image analysis model adjustment method and a related image analysis apparatus capable of increasing image analysis efficiency and accuracy.

2. Description of the Prior Art

A surveillance camera may lose focus due to weather conditions, external forces, or use fatigue. Even if the surveillance camera performs an automatic focusing function, it is difficult to ensure that the surveillance camera completed the automatic focusing function can continuously capture the clear detection image. The conventional surveillance camera analyzes spatial domain information of the detection image to determine a focus state; however, an amount of the spatial domain information of the detection image is huge, which requires a large-capacity memory unit to store related information of the detection image, and further requires complex computation process and lengthy computation time to determine the focus state of the detection image. Therefore, design of an image recognition method and a related image analysis apparatus capable of rapidly and accurately determining whether the detection image is in the focus state and integrating frequency responses of several sub-images for preferred accuracy is an important issue in the surveillance camera industry.

SUMMARY OF THE INVENTION

The present invention provides an image analysis model adjustment method and a related image analysis apparatus capable of increasing image analysis efficiency and accuracy for solving above drawbacks.

According to the claimed invention, an image analysis model adjustment method is applied to an image analysis apparatus with an operation processor and an image receiver. The image analysis model adjustment method includes dividing a detection image acquired by the image receiver into a plurality of first sub-images via a valid size and transforming the plurality of first sub-images from a spatial domain to a frequency domain for generating a plurality of first frequency domain images, distributing the plurality of first frequency domain images into several crop groups via a predefined set value, analyzing several frequency responses at the same frequency in several first frequency domain images contained by each crop group to provide a representative frequency response, collecting several representative frequency responses of the crop groups at all frequencies to generate frequency domain group data, and analyzing the frequency domain group data to acquire a prediction result of the detection image so as to decide whether to adjust the valid size for division of the detection image in accordance with the prediction result.

According to the claimed invention, an image analysis apparatus includes an imager receiver and an operation processor. The imager receiver is adapted to acquire a detection image. The operation processor is electrically connected to the imager receiver. The operation processor is adapted to divide the detection image into a plurality of first sub-images via a valid size and transforming the plurality of first sub-images from a spatial domain to a frequency domain for generating a plurality of first frequency domain images, to distribute the plurality of first frequency domain images into several crop groups via a predefined set value, to analyze several frequency responses at the same frequency in several first frequency domain images contained by each crop group to provide a representative frequency response, to collect several representative frequency responses of the crop groups at all frequencies to generate frequency domain group data, and to analyze the frequency domain group data to acquire a prediction result of the detection image so as to decide whether to adjust the valid size for division of the detection image in accordance with the prediction result.

The image analysis apparatus and the image analysis model adjustment method of the present invention can divide the detection image into the large-size sub-images via several possible crop sizes, and the large-size sub-images can be applied for the image analysis model to acquire the best solution of the crop size. Then, the valid size in the various possible ways that are smaller than or equal to the crop size can be set and applied to the image analysis model to acquire the best solution of the valid size. Finally, the valid size can be used to divide the detection image into the sub-images, and the crop group can be defined in accordance with the predefined set value; each crop group can be used to accordingly generate the representative first frequency domain image by the image analysis model adjustment method of the present invention, and the representative first frequency domain image can be transformed into the frequency domain group data of the detection image. The frequency domain group data can be applied for the image analysis model to adjust the phase parameter in different transformation phases, so as to optimize the prediction result of the next phase.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
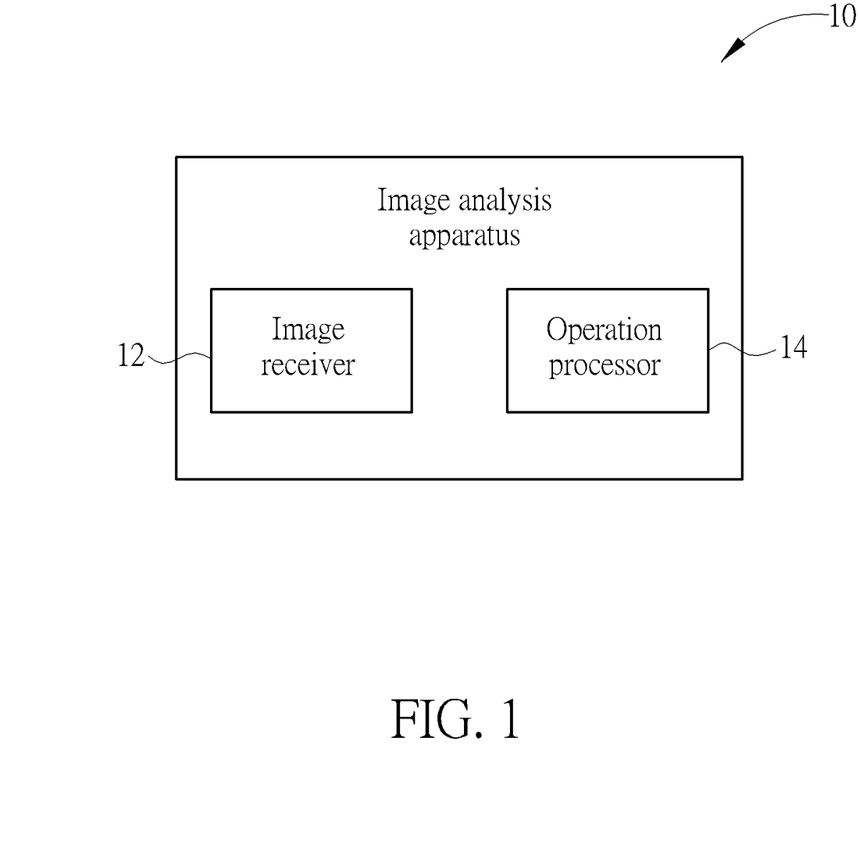
FIG. 1 is a functional block diagram of an image analysis apparatus according to an embodiment of the present invention.
Figure 2:
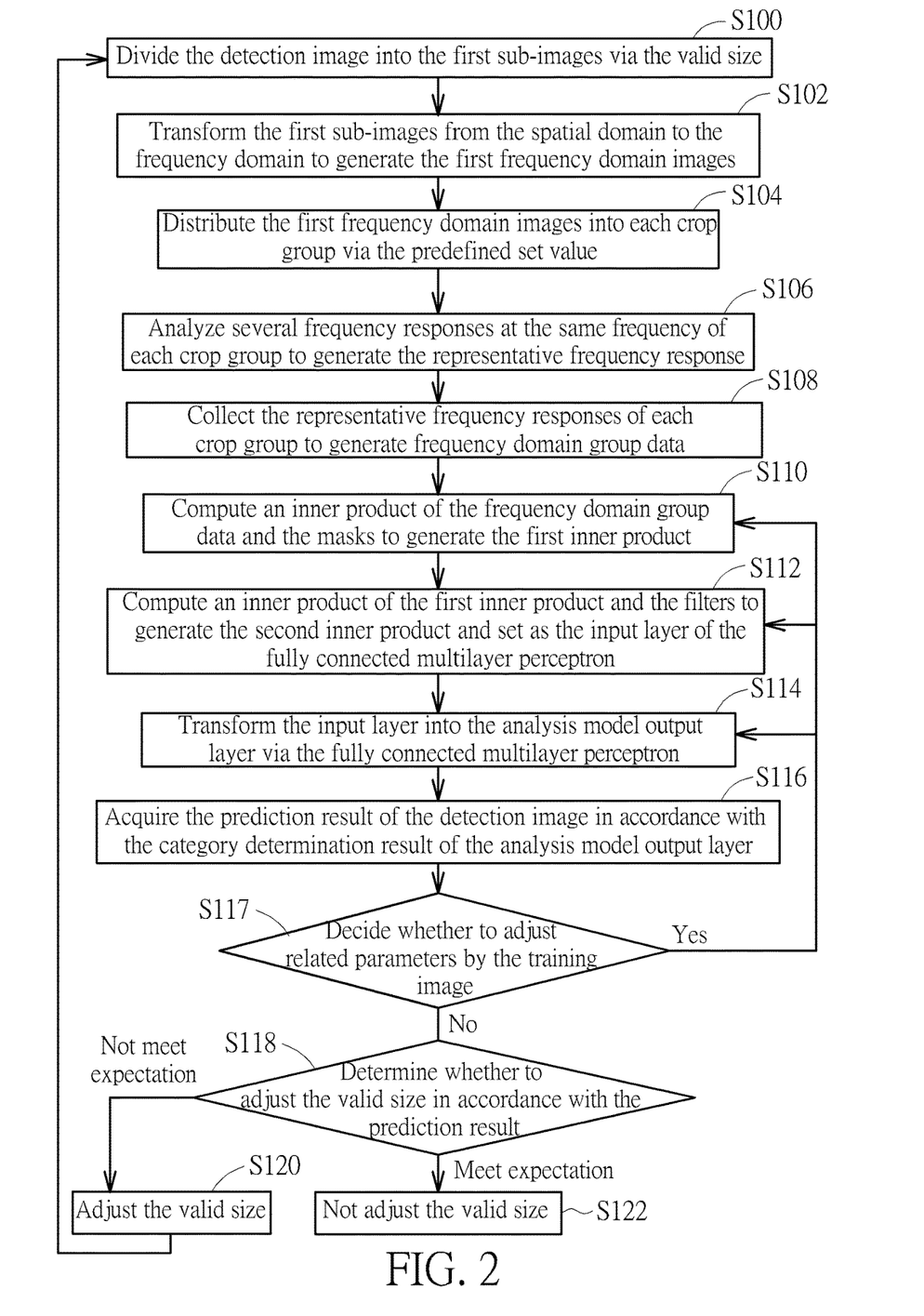
FIG. 2 is a flow chart of an image analysis model adjustment method according to a first embodiment of the present invention.

Please refer to FIG. 1 and FIG. 2. FIG. 1 is a functional block diagram of an image analysis apparatus 10 according to an embodiment of the present invention. FIG. 2 is a flow chart of an image analysis model adjustment method according to a first embodiment of the present invention. The image analysis apparatus 10 can include an image receiver 12 and an operation processor 14. The image receiver 12 can capture and acquire a detection image directly, or can receive the detection image captured by an external camera. The operation processor 14 can be electrically connected to the image receiver 12 in a wire manner or in a wireless manner. The image analysis apparatus 10 can be optionally installed by the road, and a vehicle on the road can be an identified object; the road and the vehicle are positioned within a surveillance area of the detection image. The vehicle may be located on a part of the detection image, so that the operation processor 14 can execute the image analysis model adjustment method of the present invention to determine how to divide the detection image into several sub-images that can accurately cover and extract identification features of the identified object, so as to adaptively adjust an image analysis model for preferred identification accuracy.

Figure 3:
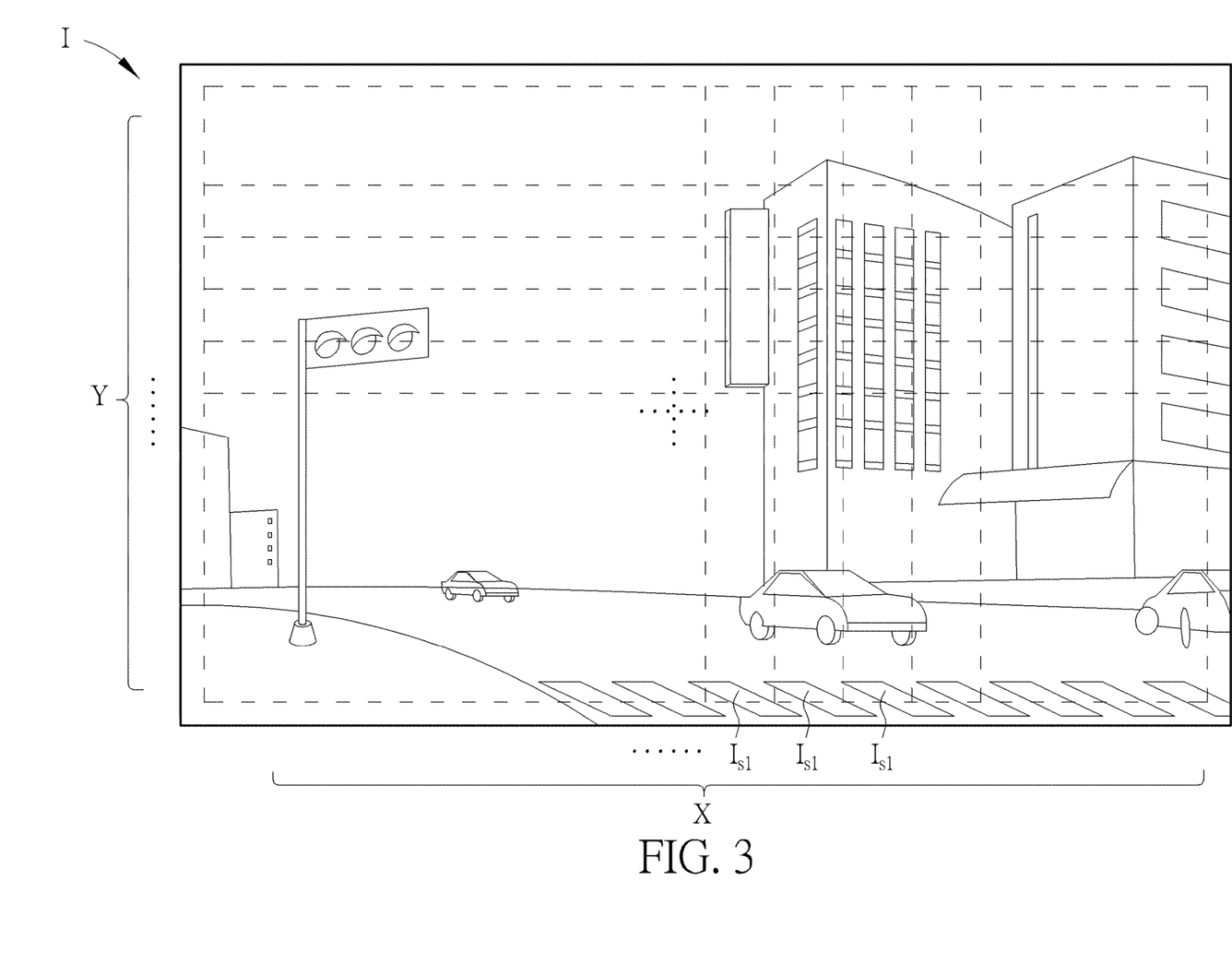
FIG. 3 is a diagram of the detection image acquired by the image analysis apparatus and executed by the image analysis model adjustment method according to the embodiment of the present invention.

Please refer to FIG. 3 to FIG. 7. FIG. 3 is a diagram of the detection image I acquired by the image analysis apparatus 10 and executed by the image analysis model adjustment method according to the embodiment of the present invention. FIG. 4 to FIG. 7 are diagrams of the detection image I in different transformation phases at the frequency domain according to the embodiment of the present invention. The image analysis model adjustment method illustrated in FIG. 2 can be suitable for the image analysis apparatus 10 shown in FIG. 1 and the detection image I shown in FIG. 3 to FIG. 7. First, step S100 can be executed that the image analysis model adjustment method divides the detection image I into a plurality of first sub-images Is1 via a valid size. The image analysis model adjustment method may divide the whole detection image I into the plurality of first sub-images Is1 via the valid size, or can divide a specific range inside the detection image I into the plurality of first sub-images Is1 via the valid size; the specific range can be a predefined region of interest, or can be a part of the detection image I marked by motion detection, and application of the specific range can depend on a design demand. The preferred embodiment of the present invention can uniformly divide the whole detection image I into the plurality of first sub-images Is1, and only some of the first sub-images Is1 are marked in FIG. 3 for simplicity.

Figure 4:
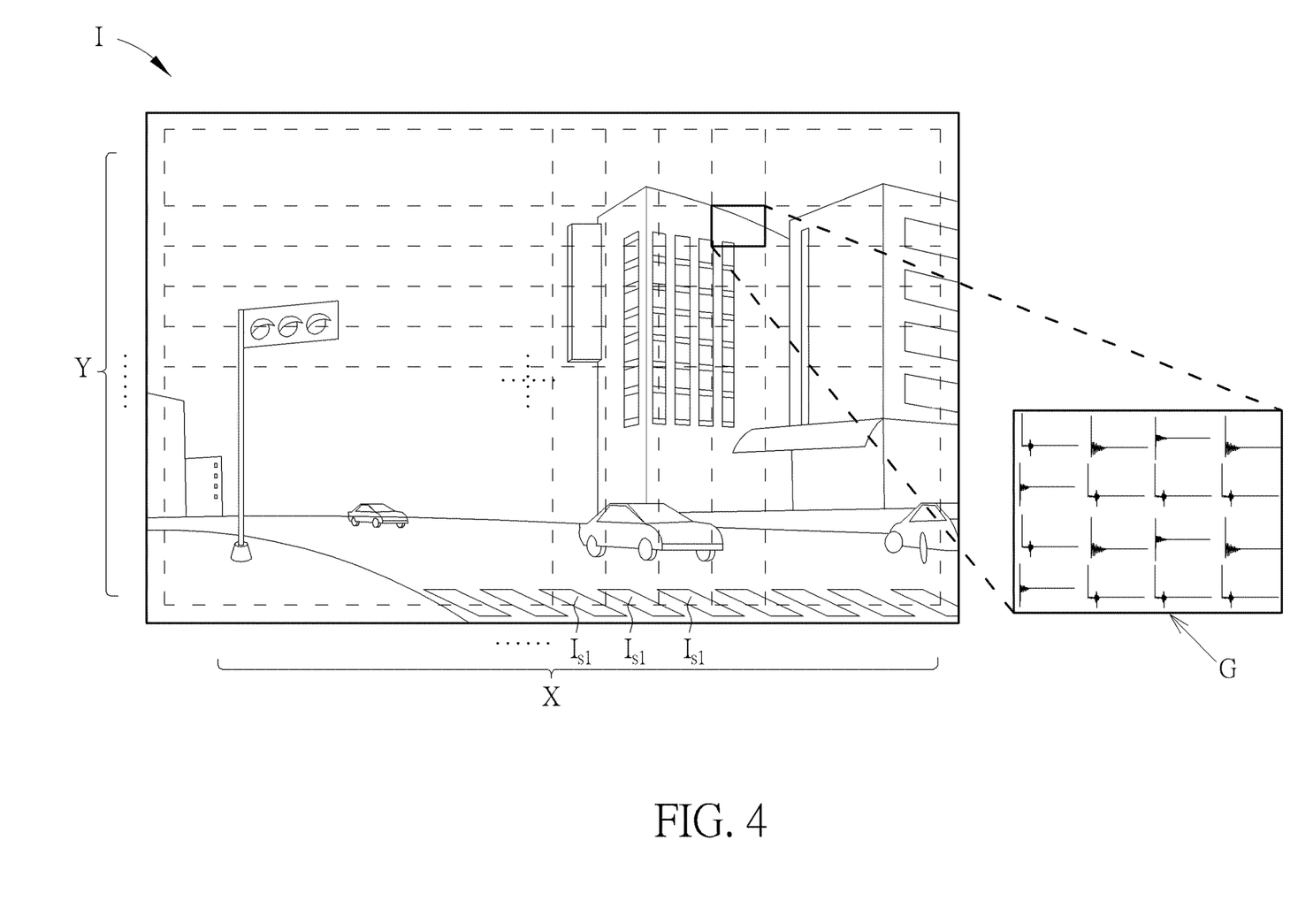
FIG. 4 to FIG. 7 are diagrams of the detection image in different transformation phases at the frequency domain according to the embodiment of the present invention.

Then, step S102 and step S104 can be executed to transform the plurality of first sub-images Is1 from a spatial domain to a frequency domain for generating a plurality of first frequency domain images, and distribute the plurality of first frequency domain images into several crop groups G via a predefined set value S. If the image analysis model adjustment method divides the specific range of the detection image I into the first sub-images Is1, the division-acquired first sub-image Is1 or the related first frequency domain images can be set as one crop group G. In the preferred embodiment of the present invention, the whole detection image I can be divided into the plurality of first sub-images Is1, and each of the plurality of first sub-images Is1 can be transformed into one first frequency domain image, as shown in FIG. 3; a specific number of the first sub-images Is1 or the related first frequency domain images can be defined as one crop group G, as shown in FIG. 4. For example, the image size of the detection image I may have 2560×1280 pixels; if the valid size is 64 pixels, the detection image I can be divided into the plurality of first sub-images Is1 arranged in an array 40×20, and the image size of each first sub-image Is1 can have 64×64 pixels; if the predefined set value S is 4, each crop group G can have the first sub-images Is1 or the first frequency domain images arranged in an array 4×4.

Figure 5:
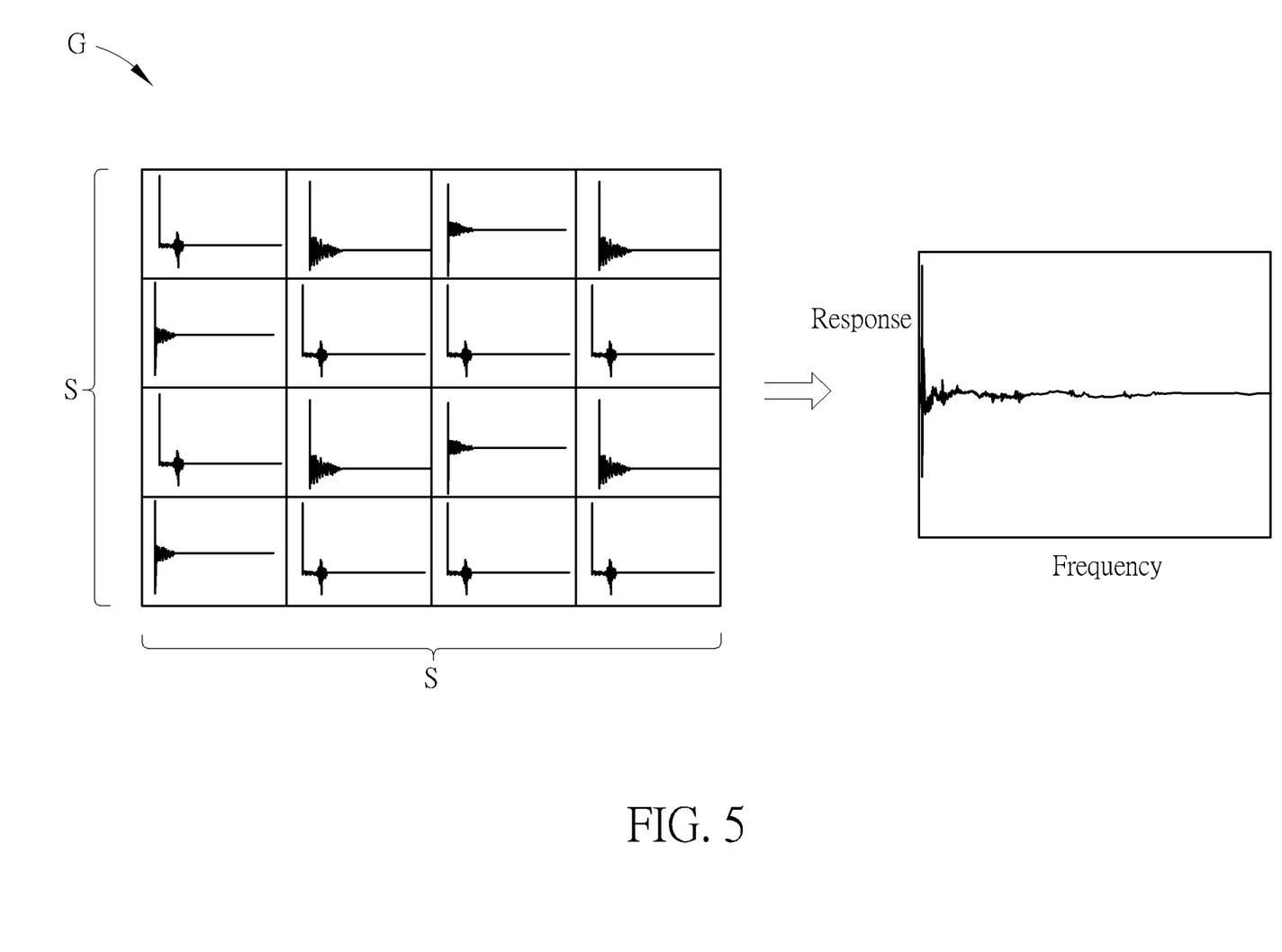
Figure 6:
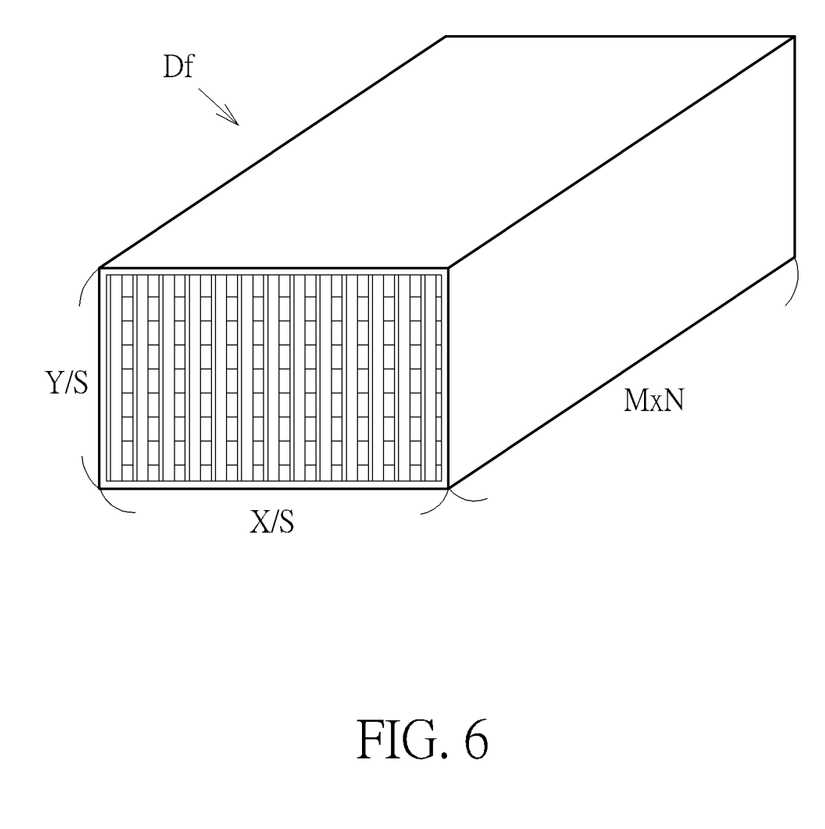

Then, step S106 and step S108 can be executed to analyze several frequency responses at the same frequency in several first frequency domain images contained by each crop group G to generate a representative frequency response, and collect several representative frequency responses of the crop groups G at all frequencies to generate frequency domain group data Df corresponding to the crop groups G. The unit of a horizontal axis of the first frequency domain image is frequency, and the unit of a vertical axis of the first frequency domain image is response. The horizontal axis of the first frequency domain image can correspond to a depth value "M×N" (ex. 4096=64×64) of the frequency domain group data Df. Therefore, step S106 can acquire 16 frequency responses respectively from 16 first frequency domain images at any frequency in each crop group G, and utilize the 16 frequency responses to generate the representative frequency response for the foresaid frequency; the embodiment can find out the largest frequency response from the 16 frequency responses to set as the representative frequency response, and a setting manner of the representative frequency response is not limited to the above-mentioned embodiment. Each frequency in the crop group G can have one representative frequency response, so that step S108 can collect the representative frequency responses of all frequencies (which may be equal to the depth value as 4096) in each crop group G to generate the frequency domain group data Df, as shown in FIG. 5 and FIG. 6.

Figure 7:
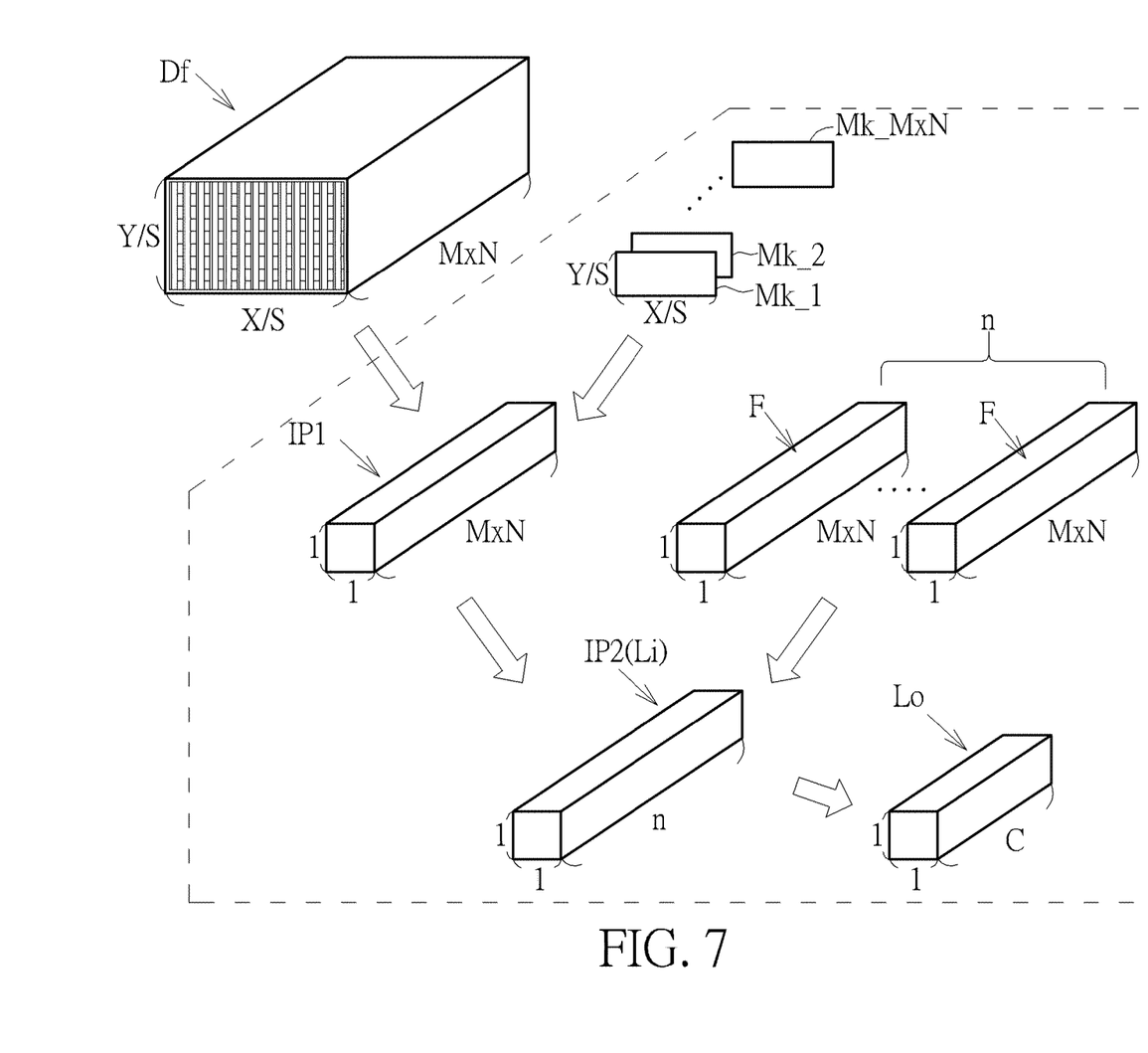

Then, step S110, step S112, step S114 and step S116 can be executed to compute an inner product of the frequency domain group data Df and a plurality of masks Mk to generate a first inner product IP1, to compute an inner product of the first inner product IP1 and a plurality of filters F to generate a second inner product IP2 for setting as an input layer Li of a fully connected multilayer perceptron, to transform the input layer Li into an analysis model output layer Lo via the fully connected multilayer perceptron, and to acquire a prediction result of the detection image I in accordance with a category determination result of the analysis model output layer Lo. As shown in FIG. 7, a number of the masks Mk can be M×N. The M×N masks Mk can respectively compute its inner product with the frequency domain group data Df having the depth value 1–M×N to acquire the first inner product IP1 with a size of 1×1×"M×N". The first inner product IP1 can respectively compute its inner product with the n filters F to acquire the second inner product IP2 with a size of 1×1×n. The analysis model output layer Lo can optionally include several prediction categories C, such as a focus category, a slightly out of focus category, an obviously out of focus category, and a completely out of focus category. Information of the mask Mk, the filter F and the prediction category C can depend on the design demand of the image analysis model adjustment method or the image analysis apparatus 10, and a detailed description is omitted herein for simplicity.

Then, step S117 and step S118 can be executed to decide whether to adjust parameters of the mask Mk, the filter F and/or the fully connected multilayer perceptron (which may be acquired in step S110, step S112 and step S114) by a training image, and further determine whether to adjust the valid size in accordance with the prediction result of the detection image I when the related parameters are adjusted or not; this step can be judged by trial and error, or any applicable solving rules. If the prediction result is not as accurate as expected, step S120 can be executed to reduce the valid size, and the image analysis model adjustment method can return to step S100 to execute relevant process again; if the valid size is accurate as expected, the valid size is not adjusted, and step S122 can be executed to divide the detection image I directly by the current valid size; the prediction result of the frequency domain group data Df generated by foresaid division can be compared with a target label, so as to adjust a phase parameter of the frequency domain group data Df in each transformation phase in accordance with a comparison result, for optimizing the prediction result of next phase.

Therefore, the image analysis model adjustment method of the first embodiment can divide the detection image I into the plurality of first sub-images Is1, and set an array parameter of the first sub-images Is1 or the related first frequency domain images contained by each crop group G in accordance with the predefined set value S; then, the largest frequency response of all the first frequency domain images at the same frequency in each crop group G can be found out to generate a representative first frequency domain image corresponding to each crop group G. The frequency response of the integrated first frequency domain image at each frequency on the horizontal axis can be set as the largest one of the 16 frequency responses of the first frequency domain images at the related frequency contained by each crop group G corresponding to the representative first frequency domain image. The representative first frequency domain images of all the crop groups G can be transformed into the frequency domain group data Df, and the frequency domain group data Df can be applied to the image analysis model for determining whether to adjust the valid size of the first sub-image Is1, so as to rapidly and accurately find classification rules that best match the input image of the image analysis model and the target label of an expected model, for achieving a purpose of image analysis and identification.

Figure 8:
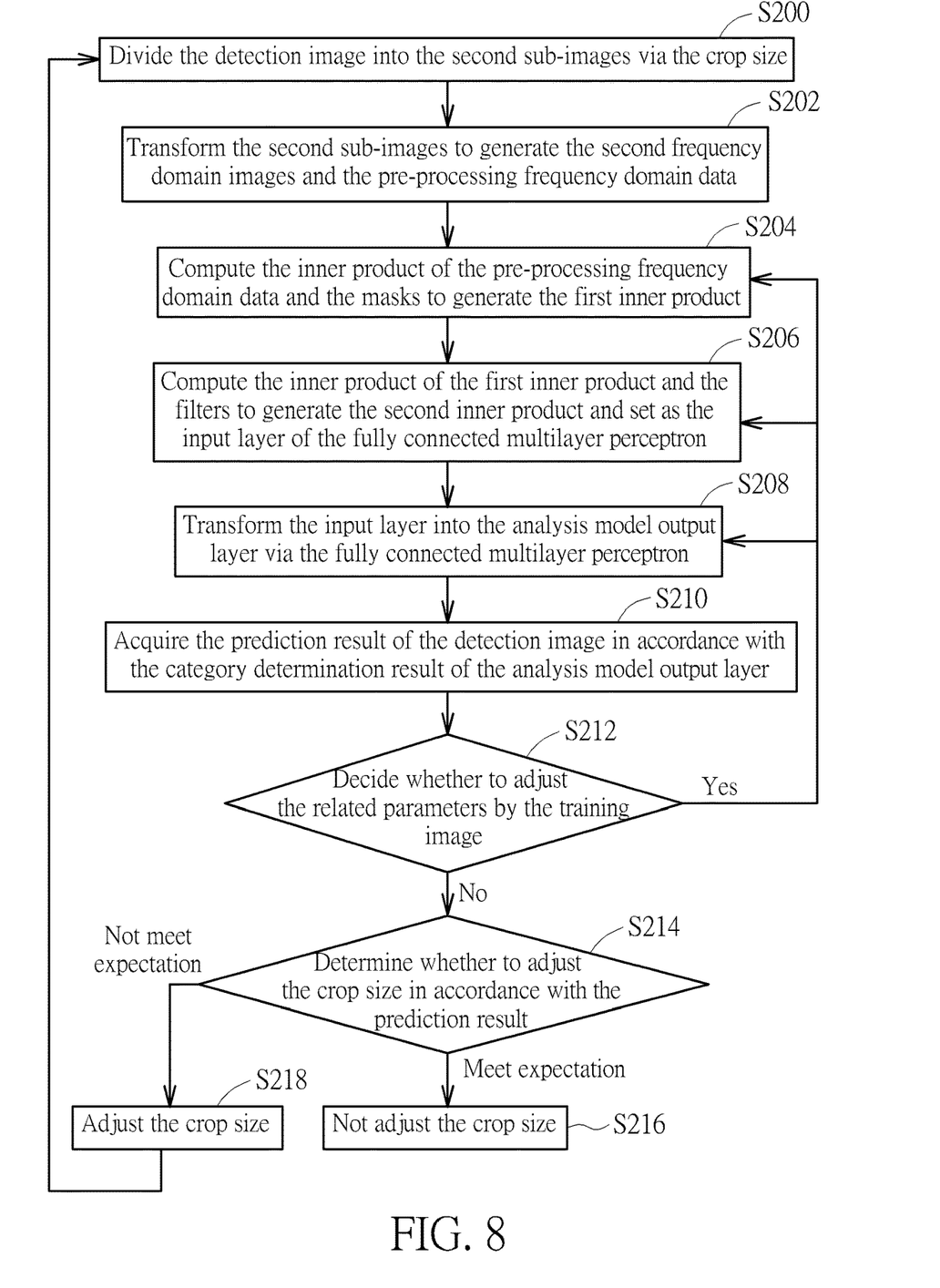
FIG. 8 is a flow chart of the image analysis model adjustment method according to a second embodiment of the present invention.

Please refer to FIG. 8. FIG. 8 is a flow chart of the image analysis model adjustment method according to a second embodiment of the present invention. In the second embodiment, elements having the same numerals as ones of the first embodiment have the same definition and functions, and the detailed description is omitted herein for simplicity. In the image analysis model adjustment method of the second embodiment, step S200 and step S202 can be executed to divide the detection image I into a plurality of second sub-images Is2 via a crop size, and transform the plurality of second sub-images Is2 from the spatial domain to the frequency domain for generating the plurality of second frequency domain images and a plurality of pre-processing frequency domain data. The crop size can be greater than or equal to the valid size, and can be an integer multiple of the valid size. If the crop size is equal to the valid size, it can represent that features in a range contained by the crop size are accurate; if the crop size is greater than the valid size, it can represent that the features in the range contained by the crop size is inaccurate, and the valid size can be used to further define the features. Then, step S204, step S206, step S208 and step S210 can be executed to compute the inner product of the pre-processing frequency domain data and the masks to generate the first inner product, to compute an inner product of the first inner product and the filters to generate the second inner product for setting as the input layer of the fully connected multilayer perceptron, to transform the input layer into the analysis model output layer via the fully connected multilayer perceptron, and to acquire the prediction result of the detection image I in accordance with the category determination result of the analysis model output layer.

Functions of step S204, step S206, step S208 and step S210 can be similar to functions of step S110, step S112, step S114 and step S116, and the detailed description is omitted herein for simplicity. Then, step S212 and step S214 can be executed to decide whether to adjust the parameters of the mask Mk, the filter F and/or the fully connected multilayer perceptron (which may be acquired in step S204, step S206 and step S208) by the training image, and determine whether to adjust the crop size in accordance with the prediction result of the detection image I when the related parameters are adjusted or not. The image analysis model adjustment method of the second embodiment can acquire the prediction result via step S210, and then decide whether to adjust the crop size in accordance with accuracy of the prediction result for acquiring the best solution of the crop size. When the best solution of the crop size is acquired, the image analysis model adjustment method of the first embodiment can be executed to find the best solution of the valid size, so as to analyze the crop size and the valid size for computing the predefined set value S. For example, if the prediction result meets expectation in step S214, the crop size acquired in step S214 can be used to compute the required valid size, and the crop size is not adjusted in step S216 then process from step S100 to step S122 can be executed accordingly. If the prediction result does not meet the expectation in step S214, step S218 can be executed to adjust the crop size and then return to step S200 for execution of related process. When the best solution of the crop size and the valid size, and the predefined set value S related to the foresaid best solution are acquired, which means the prediction result meets the expectation in step S214, the following detection image I can be divided into the sub-images directly via the valid size, and the image analysis model of the first embodiment can be executed to rapidly and accurately find the classification rules that best match the input image of the image analysis model and the target label of the expected model, for achieving the purpose of the image analysis and identification.

Figure 9:
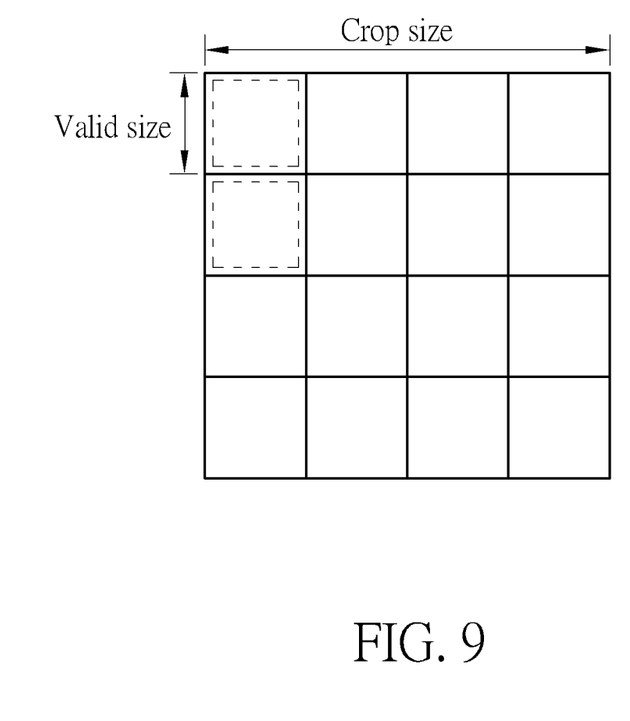
FIG. 9 is a diagram of relation of the crop size and the valid size according to the embodiment of the present invention.
Figure 10:
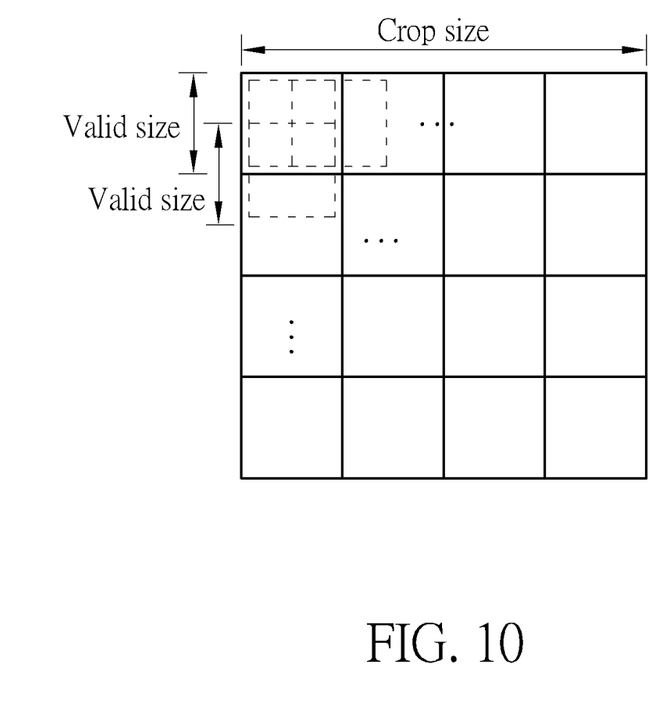
FIG. 10 is a diagram of relation of the crop size and the valid size according to another embodiment of the present invention.

The predefined set value S can be interpreted as a number of subdivided images within a range specified by the crop size that is divided via the valid size. Please refer to FIG. 9 and FIG. 10. FIG. 9 is a diagram of relation of the crop size and the valid size according to the embodiment of the present invention. FIG. 10 is a diagram of relation of the crop size and the valid size according to another embodiment of the present invention. As shown in FIG. 9, the plurality of first sub-images Is1 divided by the valid size are not overlapped, and the predefined set value S in this embodiment can be 4, so that the crop group G within the range defined by the crop size can have 16 first sub-images Is1. As shown in FIG. 10, the plurality of first sub-images Is1 divided by the valid size are partly overlapped, and the predefined set value S in this embodiment can be 7, and therefore the crop group G within the range defined by the crop size can have 49 first sub-images Is1.

For example, the image size of the detection image I can have 2560×1280 pixels, the crop size may be 128 pixels or 256 pixels or 512 pixels. The crop size in various possible ways can be respectively applied for the image analysis model adjustment method of the second embodiment, for finding the best solution of the crop size in accordance with the prediction result of the detection image I. If the best solution of the crop size is 256 pixels, the valid size may be 256 pixels or 128 pixels or 64 pixels or 32 pixels or 16 pixels, and the valid size in various possible ways can be respectively applied for the image analysis model adjustment method of the first embodiment, for finding the best solution of the valid size in accordance with the prediction result of the detection image I. If the best solution of the valid size is 64 pixels, the following detection image I can utilize the foresaid valid size to execute the image analysis model of the first embodiment, so as to effectively filter the image noise for increasing systematic accuracy.

Figure 11:
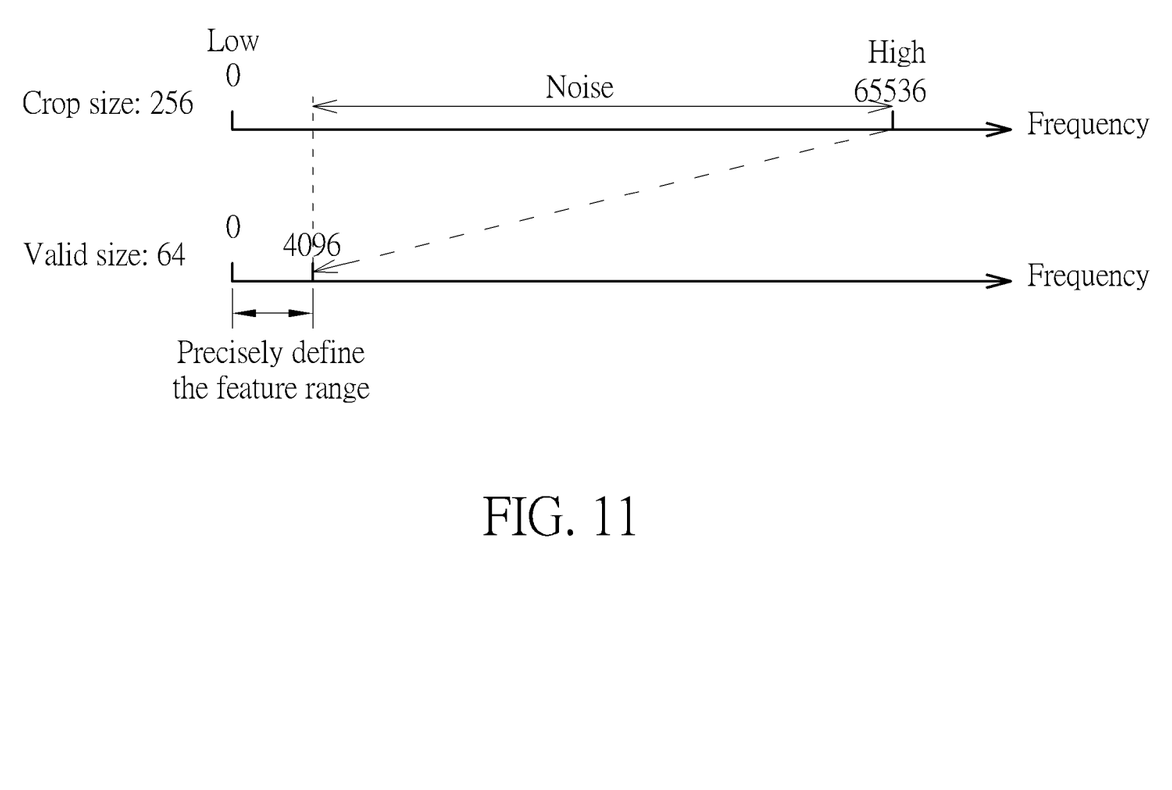
FIG. 11 is a diagram of relation of positioning and accuracy of frequency feature according to the embodiment of the present invention.

Therefore, the present invention can preferably execute the image analysis model adjustment method of the second embodiment, to position the feature range inside the detection image I in step S200 and step S202, and to adjust parameters of each layer in the image analysis model in steps S204-S212, and then to decide whether or how to adjust the crop size in steps S214-S218. When the crop size is decided, the image analysis model adjustment method of the first embodiment can be executed to precisely define the features inside the detection image I in steps S100-S108, and to adjust the parameters of each layer in the image analysis model in steps S110-S117, and then to decide whether or how to adjust the valid size in steps S118-S122. Please refer to FIG. 11. FIG. 11 is a diagram of relation of positioning and accuracy of frequency feature according to the embodiment of the present invention. As shown in FIG. 11 and foresaid content, the crop size and the valid size can be used to decide the feature range and precisely define the feature, so as to effectively filter the image noise for improving the accuracy of the image analysis and identification.

In conclusion, the image analysis apparatus and the image analysis model adjustment method of the present invention can divide the detection image into the large-size sub-images via several possible crop sizes, and the large-size sub-images can be applied for the image analysis model to acquire the best solution of the crop size. Then, the valid size in the various possible ways that are smaller than or equal to the crop size can be set and applied to the image analysis model to acquire the best solution of the valid size. Finally, the valid size can be used to divide the detection image into the sub-images, and the crop group can be defined in accordance with the predefined set value; each crop group can be used to accordingly generate the representative first frequency domain image by the image analysis model adjustment method of the present invention, and the representative first frequency domain image can be transformed into the frequency domain group data of the detection image. The frequency domain group data can be applied for the image analysis model to adjust the phase parameter in different transformation phases, so as to optimize the prediction result of the next phase.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image analysis model adjustment method applied to an image analysis apparatus with an operation processor and an image receiver, the image analysis model adjustment method comprising:
   the operation processor dividing a detection image acquired by the image receiver into a plurality of first sub-images via a valid size and transforming the plurality of first sub-images from a spatial domain to a frequency domain for generating a plurality of first frequency domain images;
   the operation processor distributing the plurality of first frequency domain images into several crop groups via a predefined set value;
   the operation processor analyzing several frequency responses at the same frequency in several first frequency domain images contained by each crop group to provide a representative frequency response;
   the operation processor collecting several representative frequency responses of the crop groups at all frequencies to generate frequency domain group data; and
   the operation processor analyzing the frequency domain group data to acquire a prediction result of the detection image so as to decide whether to adjust the valid size for division of the detection image in accordance with the prediction result.

2. The image analysis model adjustment method of claim 1, further comprising:
   the operation processor finding out a largest frequency response from the several frequency responses at the same frequency to set as the representative frequency response.

3. The image analysis model adjustment method of claim 1, further comprising:
   the operation processor dividing the detection image into a plurality of second sub-images via a crop size and transforming the plurality of second sub-images from the spatial domain to the frequency domain for generating a plurality of second frequency domain images;
   the operation processor analyzing the plurality of second frequency domain images to acquire another prediction result of the detection image; and
   the operation processor deciding whether to adjust the crop size in accordance with the foresaid another prediction result.

4. The image analysis model adjustment method of claim 3, further comprising:
   the operation processor analyzing the valid size and the crop size to compute the predefined set value.

5. The image analysis model adjustment method of claim 3, wherein the crop size is greater than or equal to the valid size, and is an integer multiple of the valid size.

6. The image analysis model adjustment method of claim 3, further comprising:
   the operation processor generating an analysis model output layer by an inner product of the frequency domain group data transformed via a plurality of masks and several filters through a fully connected multilayer perceptron; and
   the operation processor acquiring a prediction result in accordance with a category determination result of the analysis model output layer.

7. The image analysis model adjustment method of claim 6, further comprising:
   the operation processor comparing the prediction result with a target label to adjust a phase parameter of the frequency domain group data in each transformation phase in accordance with a comparison result, so as to optimize the prediction result of next phase.

8. The image analysis model adjustment method of claim 6, further comprising:

the operation processor acquiring a plurality of detection image classified by the category determination result to determine whether to adjust the crop size and the valid size.

9. The image analysis model adjustment method of claim 1, further comprising:

the operation processor analyzing the frequency domain group data to acquire a prediction result of the detection image so as to decide whether to adjust the valid size for division of the detection image in accordance with the prediction result and then for dividing a detection image.

10. An image analysis apparatus, comprising:

an imager receiver adapted to acquire a detection image; and an operation processor electrically connected to the imager receiver, the operation processor being adapted to divide the detection image into a plurality of first sub-images via a valid size and transforming the plurality of first sub-images from a spatial domain to a frequency domain for generating a plurality of first frequency domain images, to distribute the plurality of first frequency domain images into several crop groups via a predefined set value, to analyze several frequency responses at the same frequency in several first frequency domain images contained by each crop group to provide a representative frequency response, to collect several representative frequency responses of the crop groups at all frequencies to generate frequency domain group data, and to analyze the frequency domain group data to acquire a prediction result of the detection image so as to decide whether to adjust the valid size for division of the detection image in accordance with the prediction result.

11. The image analysis apparatus of claim 10, wherein the operation processor is adapted to further find out a largest frequency response from the several frequency responses at the same frequency to set as the representative frequency response.

12. The image analysis apparatus of claim 10, wherein the operation processor is adapted to further divide the detection image into a plurality of second sub-images via a crop size and transforming the plurality of second sub-images from the spatial domain to the frequency domain for generating a plurality of second frequency domain images, to analyze the plurality of second frequency domain images to acquire another prediction result of the detection image, and to decide whether to adjust the crop size in accordance with the foresaid another prediction result.

13. The image analysis apparatus of claim 12, wherein the operation processor is adapted to further analyze the valid size and the crop size to compute the predefined set value.

14. The image analysis apparatus of claim 12, wherein the crop size is greater than or equal to the valid size, and is an integer multiple of the valid size.

15. The image analysis apparatus of claim 12, wherein the operation processor is adapted to further generate an analysis model output layer by an inner product of the frequency domain group data transformed via a plurality of masks and several filters through a fully connected multilayer perceptron, and to acquire a prediction result in accordance with a category determination result of the analysis model output layer.

16. The image analysis apparatus of claim 15, wherein the operation processor is adapted to further compare the prediction result with a target label to adjust a phase parameter of the frequency domain group data in each transformation phase in accordance with a comparison result, so as to optimize the prediction result of next phase.

17. The image analysis apparatus of claim 15, wherein the operation processor is adapted to further acquire a plurality of detection image classified by the category determination result to determine whether to adjust the crop size and the valid size.

18. The image analysis apparatus of claim 15, further comprising:

the operation processor analyzing the frequency domain group data to acquire a prediction result of the detection image so as to decide whether to adjust the valid size for division of the detection image in accordance with the prediction result and then for dividing a detection image.

* * * * *